(12) United States Patent
Lee et al.

(10) Patent No.: US 7,068,501 B2
(45) Date of Patent: *Jun. 27, 2006

(54) REMOVABLE HARD DISK MODULE

(75) Inventors: Jen-Hsiang Lee, Taipei (TW);
Chih-Wei Kao, Taoyuan (TW);
Yen-Yin Yu, Yung Ho (TW)

(73) Assignee: Quanta Computer, Inc., Taoyuan Hsien (TW)

( * ) Notice: Subject to any disclaimer, the term of this patent is extended or adjusted under 35 U.S.C. 154(b) by 16 days.

This patent is subject to a terminal disclaimer.

(21) Appl. No.: 10/810,665

(22) Filed: Mar. 29, 2004

(65) Prior Publication Data

US 2005/0013109 A1 Jan. 20, 2005

(30) Foreign Application Priority Data

Jul. 14, 2003 (TW) ................................ 92119180 A

(51) Int. Cl.
*G06F 1/16* (2006.01)

(52) U.S. Cl. ...................... 361/685; 439/157; 710/301; 206/307

(58) Field of Classification Search ........ 361/679–687, 361/724–727; 360/69; 439/157; 312/223.1–223.2; 206/307; 710/301; 359/388; 104/156
See application file for complete search history.

(56) References Cited

U.S. PATENT DOCUMENTS

| 5,233,594 A * | 8/1993 | Wilhelm ...................... 361/685 |
| 5,253,129 A * | 10/1993 | Blackborow et al. ......... 360/69 |
| 5,435,737 A * | 7/1995 | Haga et al. .................. 439/157 |
| 5,564,339 A * | 10/1996 | Miura et al. ................. 104/156 |
| 6,594,076 B1 * | 7/2003 | Satou ......................... 359/388 |
| 2005/0013108 A1 * | 1/2005 | Lee ............................ 361/685 |

* cited by examiner

*Primary Examiner*—Hung Van Duong
(74) *Attorney, Agent, or Firm*—Rabin & Berdo, PC

(57) ABSTRACT

A removable hard disk module is described. The removable hard disk module has a module sidewall, a first slide rail, and a second slide rail. The first slide rail and the second slide rail are fixed on the module sidewall and the second slide rail is disposed above the first slide rail. The first slide rail is made of a linear material such as a piano wire or the like. The second slide rail is directly formed on the module sidewall or made of the linear material. The removable hard disk module further includes a handle with a withdrawal post to push a support stud on a module fixing device for withdrawing the removable hard disk module from the module fixing device when the handle is opened.

18 Claims, 2 Drawing Sheets

REMOVABLE HARD DISK MODULE

FIELD OF THE INVENTION

The present invention relates to a removable hard disk module, and more particularly, to a removable hard disk module with a linear slide rail.

BACKGROUND OF THE INVENTION

Information technology and the computer industry are highly developed now. People rely heavily on computer systems. Therefore, computer servers with high calculation capacity and high stability are important for computer systems. Due to increasingly reduced office space, area occupied by computer servers must also be reduced. Since computer servers maintain a high degree of stability to serve users, and the space occupied by one computer server is usually greater than or equal to that of a desktop computer. The management of computer servers is difficult and space utilization is tightened. Some normal companies have 2 or 3 computer servers, while some others may have more than a thousand computer servers. Computer server management and space utilization become more critical in companies with more computer servers.

A 1U computer server assembled on a standard 1U server rack is the mainstream computer server arrangement. Each standard layer of the rack is about 1.75 inches (about 4.5 centimeters), so that the 1U server and the rack effectively conserve occupational space of the computer servers. Moreover, the 1U servers and racks are more efficiently controlled because the 1U servers and racks can be centrally managed and easily stacked. Normally, hardware used in the 1U server is provided with a smaller size and lower height to fit the thickness limitation of 1.75 inches. A server system is convenient to user for seeking or storing data because the server rack usually provides numerous hard disks to store data therein. Especially, the hard disks on the server racks are convenient to data exchange, repair and installation because each hard disk is installed in a removable module and the removable module is installed in the server rack.

The dimensions of the server rack and the dimension of the removable module limit the quantity of conventional removable hard disk modules which can be installed in one server rack. That is to say, due to the width and height limitation, some residual space of the server rack cannot be utilized for hard disk installation. Generally, the horizontal width of the server rack is wider than the total horizontal width of four horizontal hard disks. However, for firmly installing the hard disk in the removable module and on the server rack to pass environment tests, e.g. drop test, vibration test, and shock test, to ensure the quality and life span of the server system, a sliding mechanism of a conventional removable module is coupled to a corresponding sliding mechanism of a fixing device fixed in the server rack. The corresponding sliding mechanism and the sliding mechanisms are usually disposed on the top surface and the bottom surface of the fixing module and the removable module respectively to provide suitable fixing and shock absorption for the hard disk and the removable module.

However, the horizontal residual space of the server rack is useless when the sliding mechanism is disposed on the top surface and the bottom surface of the removable module. Further, the thickness of the removable module is increased so that the total quantity of the hard disks and the removable module, which can be installed in the server rack, is reduced in a thickness direction.

However, if the sliding mechanisms are disposed on sidewalls of the removable module, the quantity of the hard disks and the removable modules, which can be installed in the server rack, is about only three in the horizontal width direction. Therefore, the space of the server rack is wasted, and especially in the horizontal width direction.

Hence, the conventional removable modules installed in the server rack cannot fully utilize the space of the server rack. Some space of the server rack is wasted, and the office space occupied by computer servers is therefore increased.

SUMMARY OF THE INVENTION

It is an object of the present invention to provide a removable hard disk module which can utilize the residual space of the server rack in the horizontal width direction to couple with the server rack.

It is another object of the present invention to provide a removable hard disk module whose slide rails can absorb shock and vibration to improve the reliability and life span of the removable hard disk and a hard disk therein.

It is further another object of the present invention to provide a removable hard disk module which can reduce a volume thereof so as to increase the quantity of hard disk installed in the server rack.

To accomplish the above objectives, the present invention provides a removable hard disk module. The removable hard disk module has a module sidewall, a first slide rail, and a second slide rail. The second slide rail is fixed above the first slide rail and both are fixed on the module sidewall. At least the first slide rail is a linear rail made of a linear material, e.g. piano wire, stainless steel wire, or the like.

The removable hard disk module is installed in a module fixing device having a supporting wall and at least two support studs on the supporting wall. The support studs couple to the first slide rail and the second slide rail to support the removable hard disk module so that the removable hard disk module can slide in the module fixing device.

The supporting stud further comprises a support block having a slim, long body to increase the contact surface for the first slide rail and the second slide rail. The removable hard disk module further comprises a handle at the front portion for convenient installation and removal of the removable hard disk module. The handle further comprises a withdrawal post to push one of the support studs to release conveniently the removable hard disk module from the module fixing device when the handle is open.

The second slide rail is directly pressed on the module sidewall or made of elastically linear material, e.g. a piano wire, a stainless wire, or the like.

The removable hard disk module according to the present invention is also utilized as a removable module that not only fixes the hard disk but also fixes an electrical device to provide a quick-withdraw function. The removable module is preferably used in a standard 1U server rack where four removable module according to the present invention can be parallel-installed in the horizontal width direction.

Hence, the removable module can provide an efficiently enough protection for the electrical device therein. Therefore, the reliability and life span of the electrical device can be enhanced. The removal and installation speed, and the installation quantity can be increased. Furthermore, the data storage capability of the server with the removable hard disk module can be efficiently increased.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
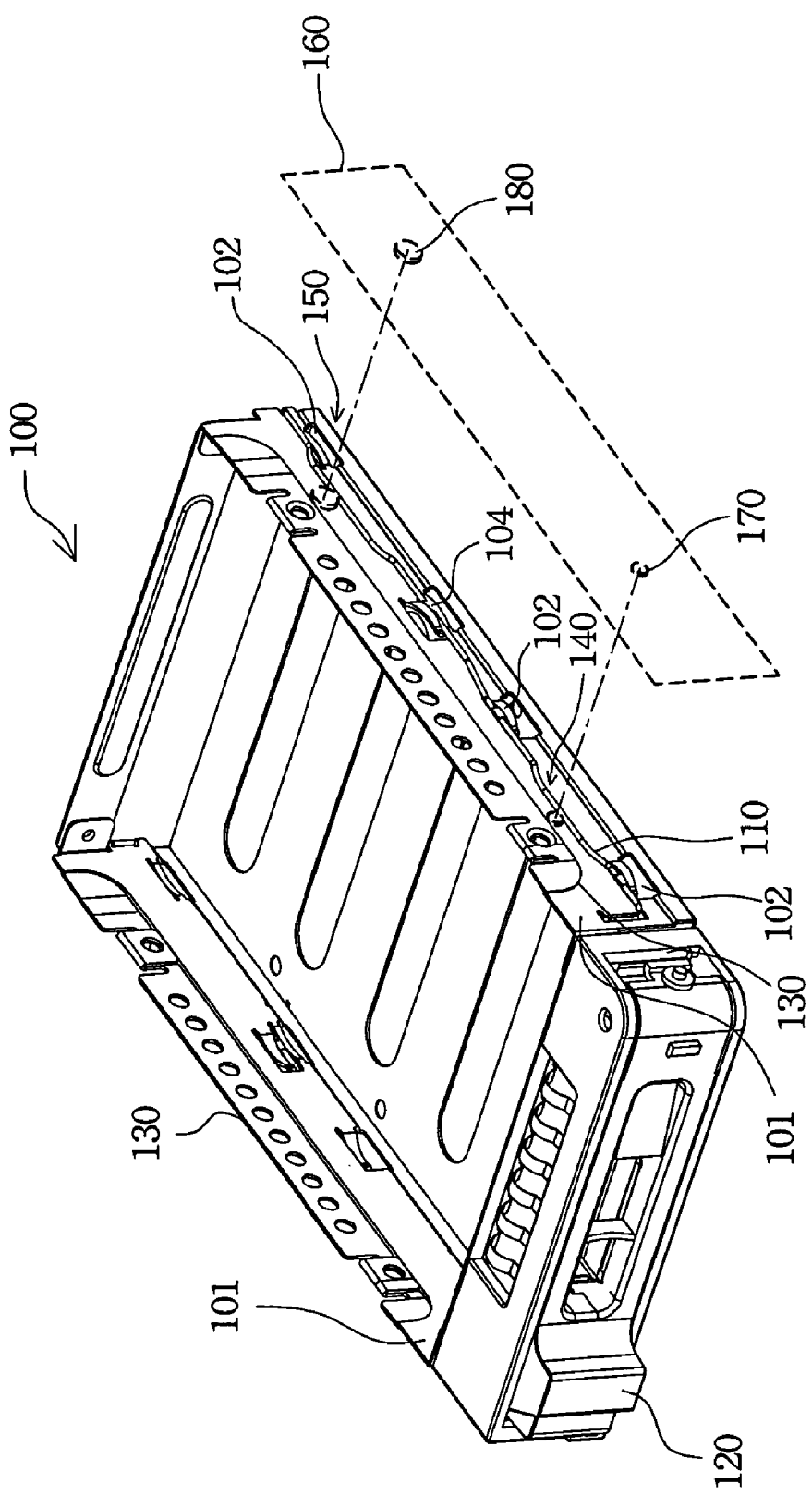
FIG. 1 is a preferred embodiment of the removable hard disk module according to the present invention.

FIG. 1 is a preferred embodiment of the removable hard disk module according to the present invention. The removable hard disk module 100 is utilized to install a hard disk therein. A module sidewall 101 of the removable hard disk module 100 includes a first slide rail 110 and a second slide rail 130 to enable the removable hard disk module 100 to slide in a module fixing device.

In the preferred embodiment, the module fixing device set on a server includes a supporting wall 160 (as indicated by the dashed line) with a pair of support studs 170 and 180 to support the removable hard disk module 100. The removable hard disk module 100 further utilizes a first slide rail 110 and a second slide rail 130 to slide on the support studs 170 and 180 so that the removable hard disk module 100 can slide along the supporting wall 160 of the module fixing device. Referring to the dashed line portion of the drawing, the supporting wall 160 and the support studs 170 and 180 thereon are configured at and cooperated with one side of the removable hard disk module 100. The first slide rail 110 is a linear slide rail with shock absorption capability and made of a linear material, e.g. a piano wire or a stainless steel wire, with about 1 mm diameter. The first slide rail 110 is a linear slide rail in a stepped zigzag shape. The linear material can be a steel wire or any high strength material wire and preferably uses the steel wire to support the removable hard disk module 100 efficiently. The first slide rail 110 made of the linear material can provide a buffer function on the removable hard disk module 100 while the removable hard disk module 100 is under an impact force or a vibration force. Therefore, even under a vibration test or an impact test, the removable hard disk module 100 can be efficiently protected and a hard disk therein can also be efficiently protected.

Additionally, the first slide rail 110 made of a linear material with only a small diameter can be strong enough to support and protect the removable hard disk module 100 and the hard disk therein. Therefore, four removable hard disk modules 100 according to the present invention can be installed in one standard 1U server rack in a horizontal width direction. The residual space of the server rack is fully used in the horizontal width direction. Furthermore, a top surface and a bottom surface of the removable hard disk module 100 are saved. Therefore, three layers of the removable hard disk modules 100 can be installed in two standard 1U server racks in the thickness direction. That is to say, twelve hard disks and twelve corresponding removable hard disk modules 100 can be installed in a standard 2U server rack. The removable hard disk modules 100 not only provide the supporting force for the hard disk but also utilize the linear slide rail providing shock absorption capability to protect the removable hard disk modules 100 and the hard disk therein from damage caused by shock force so as to improve the reliability and the life span thereof.

In the embodiment, the second slide rail 130 is directly formed on the module sidewall 101 when the module sidewall 101 is pressed. That is to say, the second slide rail 130 and the module sidewall 101 are formed in unity and simultaneously. The removable hard disk module 100 can slide on the module fixing device by the second slide rail 130 and the linear slide rail 110 while the removable hard disk module 100 arrives a predetermined position. The first slide rail 110 and the second slide rail 130 cooperate to clamp the support stud 170 and the support stud 180 at position 140 and position 150. Therefore, the removable hard disk module 100 can be efficiently fixed in the module fixing device. The removable hard disk module 100 further includes a handle 120 at the front portion thereof for convenient removal and installation of the removable hard disk module 100.

The first slide rail 110 are fixed on the module sidewall 101 with at least one rail support hook 102 and at least one rail fixing hook 104, and two ends thereof are bended to clasp the inner side of the module sidewall 101 to increase a fixing force to attach on the module sidewall 101. The linear slide rail 110 has a convex surface to reduce the sliding resistance. The first slide rail 110 has also a bended portion which is bended upward for efficiently coupling to the support stud 170 and the support stud 180 at positions 140 and 150, and the bended portion efficiently reduce impact force influencing on the removable hard disk module 100. The rail support hook 102 supports the first slide rail 110 to avoid a downward move and a lateral move. The rail fixing hook 104 further provides a top clamping force to avoid the first slide rail 110 moving up. Therefore, the first slide rail 110 can be efficiently coupled on the module sidewall 101. The support stud 170 is smaller than the support stud 180 so that the support stud 170 can easily slide across the rail fixing hook 104 without any interference.

Figure 2:
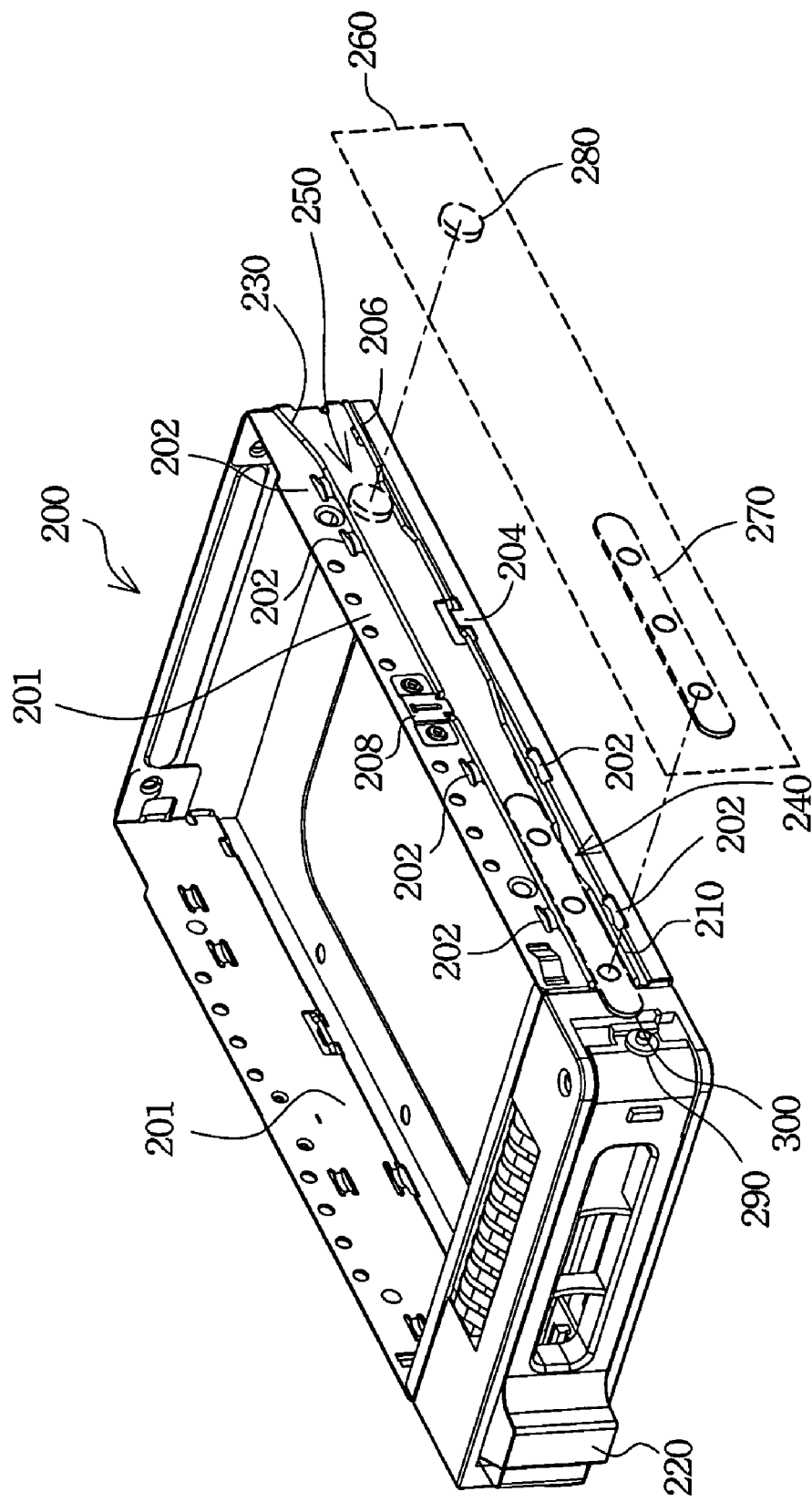
FIG. 2 is another preferred embodiment of the removable hard disk module according to the present invention.

FIG. 2 is another preferred embodiment of the removable hard disk module according to the present invention. The removable hard disk module 200 is utilized to install a hard disk therein. A module sidewall 201 of the removable hard disk module 200 includes a first slide rail 210 and a second slide rail 230 to enable the removable hard disk module 200 to slide in a module fixing device.

In the another preferred embodiment, the module fixing device set on a server includes a supporting wall 260 (as the dashed line shown) with a pair of support studs to support the removable hard disk module 200. The support studs include a support block 270 with a slim, long shape and a support stud 280. The removable hard disk module 200 further utilizes a first slide rail 210 and a second slide rail 230 to slide on the support block 270 and the support stud 280 so that the removable hard disk module 200 can slide along the supporting wall 260. Referring to the dashed line portion of the drawing, the supporting wall 260, and the support block 270 and the support stud 280 thereon are configured at and cooperated with one side of the removable hard disk module 200. The first slide rail 210 and the second slide rail 230 are both linear slide rails with shock absorption function and made of a linear material, e.g. a piano wire or a stainless steel wire, with a diameter of about 1 mm. The linear material can be a steel wire or any high strength material wire and preferably uses the steel wire to support efficiently the removable hard disk module 200. The first slide rail 210 and the second slide rail 230 made of the linear material can also provide a buffer effect on the removable hard disk module 200 when the removable hard disk module 200 is impacted or vibrated. Therefore, even under a vibration test or an impact test, the removable hard disk module 200 can be efficiently protected and a hard disk therein can also be efficiently protected.

Additionally, the first slide rail 210 and the second slide rail 230 made of a linear material with only a small diameter can support and protect the removable hard disk module 200 and the hard disk therein. Therefore, four removable hard disk modules 200 according to the present invention can be installed in one standard 1U server rack in horizontal width direction. The residual space of the server rack is fully used in the horizontal width direction. Furthermore, a top surface and a bottom surface of the removable hard disk module 200 are saved. Therefore, three layers of the removable hard disk modules 200 can be installed in two standard 1U server racks in the thickness direction. That is to say, twelve hard disks and twelve corresponding removable hard disk modules 200 can be installed in a standard 2U server rack. The removable hard disk module 200 not only provides the supporting force for the hard disk but also utilized the slide rail made of linear wire material providing shock absorption function to protect the removable hard disk module 200 and the hard disk therein from damage caused by shock so as to improve the reliability and the life span thereof.

In the embodiment, the second slide rail 230 allows the removable hard disk module 200 to slide in the module fixing device and when the removable hard disk module 200 arrives a predetermined position, the first slide rail 210 and the second slide rail 230 cooperate to clamp the support block 270 and the support stud 280 at position 240 and position 250. Therefore, the removable hard disk module 200 can be efficiently fixed in the module fixing device. The removable hard disk module 200 further includes a handle 220 at the front portion thereof for convenient removal and installation of the removable hard disk module 200. The support block 270 can efficiently increase the contact surface for the first slide rail 210 and the second slide rail 230 to increase the support force for the removable hard disk module 200. The support block 270 and the support stud 280 can be made of a plastic material or a metal material.

Both ends of the first slide rail 210 and the second slide rail 230 are bent to clasp the inner side of the module sidewall 201, thereby to increase a fixing force to attach on the removable hard disk module 200. The first slide rail 210 and the second slide rail 230 are efficiently fixed on the module sidewall 201 with rail support hooks 202 and rail fixing hook 204, 206 and 208. The rail support hook 202 supports the first slide rail 210 and the second slide rail 230 to avoid vertical movement. The rail fixing hook 204 prevents the first slide rail 210 from moving laterally. The rail fixing hook 206 further provides a top clamping force to prevent the first slide rail 210 from moving up. The rail fixing hooks 204, 206, and 208 can be various type hooks to fix the first slide rail 210 and the second slide rail 230. The rail fixing hook 208 further provides a hanging force for the second slide rail 230 to avoid the second slide rail 230 from moving up, down and laterally. The rail fixing hook 208 utilizes an under surface of a hanger to continue a slide path of the second slide rail 230, and therefore the second slide rail 230 can be fixed on the module side wall 201 and the removable hard disk module 200 can still slide on the second slide rail 230 with a smooth sliding path.

The first slide rail 210 further includes convex surfaces at positions 240 and 50 for contacting the support block 270 and the support stud 280 to clamp efficiently the support block 270 and the support stud 280 and reduce the influence of impacts on the removable hard disk module 200. The removable hard disk module 200 further includes a handle 220 at the front portion thereof for convenient removal and installation of the removable hard disk module 200. The handle 220 further includes a withdrawal post 290 close to a shaft of the handle 220. When the handle 220 is open, the withdrawal post 290 can push a withdraw surface 300 of the support block 270, one of the support studs, to withdraw the removable hard disk module 200 from the module fixing device so that the removable hard disk module 200 can be conveniently removed and installed.

The removable hard disk module utilizes a linear rail with capabilities of elasticity and shock absorption on two sidewalls of the removable hard disk module to support and protect the removable hard disk module and the hard disk therein. Furthermore, the linear rails have a small diameter so that the quantity of hard disks installed in the server rack can be efficiently increased. Therefore, the server with the removable hard disk module according to the present invention can provide more data storage volume, and also provide a quick withdraw function to enhance the speed of the installation, removal, and exchange of the hard disks. Hence, the removable hard disk module according to the present invention can enhance server management efficiency. Furthermore, the removable hard disk module according to the present invention fully utilize the space of the server rack in the horizontal and vertical directions and therefore the sliding devices can be utilized in any limited space apparatus for optimal space utilization.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A removable hard disk module installed in a module fixing device, the removable hard disk module comprising:
    a module sidewall;
    a first slide rail fixed on the module sidewall, wherein the first slide rail is an elastically linear slide rail made of a linear material; and
    a second slide rail fixed on the module sidewall and above the first slide rail, wherein the first slide rail and the second slide rail support the removable hard disk module so that the removable hard disk module slides in the module fixing device, and the module fixing device further comprises a supporting wall, the supporting wall further comprising at least two support studs to support the removable hard disk module and each of the support studs comprises a support block to increase contact surfaces for the first slide rail and the second slide rail.

2. The removable hard disk module of claim 1, wherein the first slide rail further comprises convex surfaces for clamping the support studs to reduce an influence of impact on the removable hard disk module.

3. The removable hard disk module of claim 1, wherein the removable hard disk module further comprises a handle at a front portion thereof for convenient installation and removal of the removable hard disk module.

4. The removable hard disk module of claim 1, wherein the second slide rail is directly pressed on the module sidewall.

5. The removable hard disk module of claim 1, wherein the second slide rail is made of the piano wire.

6. The removable hard disk module of claim 1, wherein the linear material comprises piano wire.

7. The removable hard disk module of claim 3, wherein the handle further comprises a withdrawal post to push one of the support studs to release conveniently the removable hard disk module from the module fixing device when the handle is open.

8. The removable hard disk module of claim 5, wherein a diameter the piano wire is about 1 mm.

9. A removable apparatus comprising:
  a removable module for fixing an electrical device therein, wherein the removable module further comprises:
  a module sidewall;
  a first slide rail fixed on the module sidewall, wherein the first slide rail is an elastically linear slide rail made of a linear material;
  a second slide rail fixed on the module sidewall and above the first slide rail wherein the second slide rail is directly pressed on the module sidewall; and
  a module fixing device, wherein the module fixing device further comprises:
  a supporting wall; and
  at least two support studs fixed on the supporting wall to couple to the first slide rail and the second slide rail of the removable module, whereby the removable module is installed and slides in the module fixing device.

10. The removable apparatus of claim 9, wherein the support stud comprises a support block to increase contact surfaces for the first slide rail and the second slide rail.

11. The removable apparatus of claim 9, wherein the removable module further comprises a handle at a front portion thereof for convenient installation and removal of the removable module.

12. The removable apparatus of claim 9, wherein the second slide rail is made of the piano wire.

13. The removable apparatus of claim 9, wherein the linear material comprises piano wire.

14. The removable apparatus of claim 11, wherein the handle further comprises a withdrawal post to push one of the support studs to withdraw conveniently the removable module when the handle is open.

15. A removable apparatus utilized in a server rack for installing an electrical device in the server rack, the removable apparatus comprising:
  a removable module for fixing the electrical device therein, wherein the removable module further comprises:
  a module sidewall;
  a first slide rail fixed on the module sidewall, wherein the first slide rail is an elastically linear slide rail made of a piano wire;
  a first rail support hook fixed on the module sidewall to support the first slide rail;
  a first rail fixing hook fixed on the module sidewall to prevent the first slide rail from moving up; and
  a second slide rail fixed on the module sidewall and above the first slide rail; and
  a module fixing device, wherein the module fixing device further comprises:
  a supporting wall;
  a first stud fixed on the supporting wall; and
  a second support stud fixed on the supporting wall, wherein the first support stud and the second support stud couple to the first slide rail and the second slide rail of the removable module, whereby the removable module is installed and slides in the module fixing device, and the first support stud is smaller than the second support stud.

16. The removable apparatus of claim 15, wherein the second slide rail is directly pressed on the module sidewall.

17. The removable apparatus of claim 15, wherein the second slide rail is made of the piano wire and is fixed on the module sidewall by a second fixing hook to prevent movement up, down, and laterally.

18. The removable apparatus of claim 15, wherein the server rack is a 1U server rack and four removable apparatuses are configured in the 1U rack in a horizontal width direction.

* * * * *